US011230069B2

(12) United States Patent
Tessier

(10) Patent No.: US 11,230,069 B2
(45) Date of Patent: Jan. 25, 2022

(54) TOOL FOR FORMING A COMPOSITE MEMBER

(71) Applicant: Bell Textron Inc., Fort Worth, TX (US)

(72) Inventor: Sylvain Tessier, Mirabel (CA)

(73) Assignee: Textron Innovations Inc., Providence, RI (US)

( * ) Notice: Subject to any disclaimer, the term of this patent is extended or adjusted under 35 U.S.C. 154(b) by 44 days.

(21) Appl. No.: 16/554,598

(22) Filed: Aug. 28, 2019

(65) Prior Publication Data

US 2021/0060872 A1    Mar. 4, 2021

(51) Int. Cl.
*B29C 70/34* (2006.01)
*B29C 70/54* (2006.01)
*B29C 65/00* (2006.01)
*B29L 31/30* (2006.01)

(52) U.S. Cl.
CPC ........ *B29C 70/34* (2013.01); *B29C 66/73751* (2013.01); *B29C 66/73755* (2013.01); *B29C 66/92651* (2013.01); *B29C 70/54* (2013.01); *B29L 2031/3088* (2013.01)

(58) Field of Classification Search
None
See application file for complete search history.

(56) References Cited

U.S. PATENT DOCUMENTS

| | | | |
|---|---|---|---|
| 3,965,942 A * | 6/1976 | Hatch | B29C 70/023 139/384 R |
| 5,954,898 A | 9/1999 | McKague et al. | |
| 6,866,738 B2 * | 3/2005 | Sato | B29C 53/04 156/199 |
| 7,655,168 B2 | 2/2010 | Jones et al. | |
| 8,444,127 B2 | 5/2013 | Watson et al. | |
| 8,632,330 B2 | 1/2014 | Jones et al. | |
| 8,790,485 B2 | 7/2014 | Whitworth et al. | |
| 9,050,758 B2 | 6/2015 | Mattia et al. | |
| 9,302,436 B2 | 4/2016 | Whitworth et al. | |
| 9,314,978 B2 | 4/2016 | Whitworth et al. | |
| 9,709,443 B2 | 7/2017 | Holmes et al. | |
| 2014/0099477 A1 | 4/2014 | Matsen et al. | |
| 2017/0114198 A1 | 4/2017 | Tudor et al. | |
| 2017/0225366 A1 | 8/2017 | Chiang et al. | |
| 2017/0246816 A1 | 8/2017 | Hopkins et al. | |

FOREIGN PATENT DOCUMENTS

| | | |
|---|---|---|
| CN | 108099245 A * | 6/2018 |
| EP | 0865357 A1 | 9/1998 |

OTHER PUBLICATIONS

Examination Report; Application No. 3,055,052; CIPO; dated Nov. 18, 2020.
Examination Report; Application No. 3,055,052; CIPO; dated Aug. 6, 2021.

\* cited by examiner

*Primary Examiner* — Barbara J Musser
(74) *Attorney, Agent, or Firm* — Lawrence Youst PLLC

(57) ABSTRACT

A method of forming a composite member, includes: applying pressure and heat with a compaction tool to a portion of an uncured composite member to decrease a thickness of the portion, the heat applied with the compaction tool being at a temperature less than a curing temperature of the uncured composite member; and curing the uncured composite member after applying pressure and heat.

20 Claims, 3 Drawing Sheets

TOOL FOR FORMING A COMPOSITE MEMBER

TECHNICAL FIELD

The application relates generally to composite materials and, more particularly, to devices and methods used for forming composite materials.

BACKGROUND

Fiber-reinforced resin materials, or "composite" materials as they are commonly known, have many applications in the aerospace, automotive, and marine fields because of their high strength-to-weight ratios, corrosion resistance, and other unique properties. Conventional composite materials' typically include glass, carbon, or polyaramide fibers in woven and/or non-woven configurations. The fibers can be pre-impregnated with uncured or partially cured resin to form fiber plies (often termed "prepregs") in a raw material stage. The fiber plies can be manufactured into parts by laminating them on a mold surface. Heat and pressure can be applied to the laminated plies to cure the resin and harden the laminate in the shape of the mold.

It is generally known to subject a laminate to a "hot debulk" process before cure, where the entire laminate is bagged, put under vacuum and heated, for example in an oven, so as to reduce its thickness. The process however requires dealing with the whole assembly, thus longer cycle times and more oven space. Moreover, the thickness reduction that can be reached with this process may be limited.

SUMMARY

In one aspect, there is provided a method of forming a composite member, comprising: applying pressure and heat with a compaction tool to a portion of an uncured composite member to decrease a thickness of the portion, the heat applied with the compaction tool being at a temperature less than a curing temperature of the uncured composite member; and curing the uncured composite member after applying pressure and heat.

In another aspect, there is provided a method of forming a composite assembly from an uncured composite member, a second composite member, and a cured composite member, the method comprising: applying pressure and heat with a compaction tool to a portion of the uncured composite member to decrease a thickness of the portion, the heat applied with the compaction tool being at a temperature less than a curing temperature of the uncured composite member; inserting the cured composite member between, and in contact with, the portion of the uncured composite member and the second composite member; and curing the uncured, second, and cured composite members to form the composite assembly after applying pressure and heat.

In yet another aspect, there is provided a compaction tool for an uncured composite member, comprising: a support configured to receive the uncured composite member thereon, a compression unit displaceable toward and away from the support and heatable to a temperature below a curing temperature of the uncured composite member, and a compressing device operable to displace the compression unit toward the support and against a portion of the uncured composite member to compact the portion between the heated compression unit and the support and reduce a thickness of the portion to be less than a thickness of a remainder of the uncured composite member.

DESCRIPTION OF THE DRAWINGS

Reference is now made to the accompanying figures in which.

DETAILED DESCRIPTION

Figure 1:
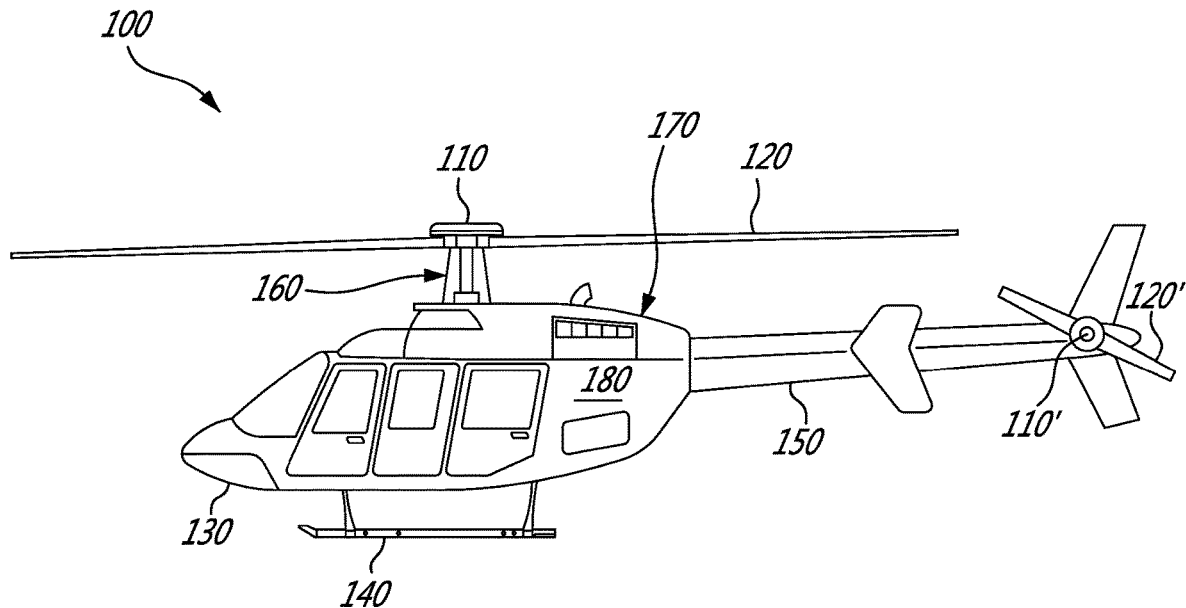
FIG. 1 is a schematic side view of an aircraft.

FIG. 1 shows a rotorcraft 100 according to one example embodiment. Rotorcraft 100 features a rotor system 110, blades 120, a fuselage 130 defining a cabin 180, a landing gear 140, and an empennage 150. Rotor system 110 rotates blades 120. Rotor system 110 includes a control system for selectively controlling the pitch of each blade 120 in order to selectively control direction, thrust, and lift of rotorcraft 100. Fuselage 130 represents the body of rotorcraft 100 and is coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110' and blades 120'. Blades 120' may provide thrust in the same direction as the rotation of blades 120 so as to counter the torque effect created by rotor system 110 and blades 120.

The rotorcraft 100 further includes a transmission 160 used for transmitting a rotational input from an engine of the rotorcraft 100 to the rotor system 110. The rotorcraft 100 includes a transmission support configured for securing the transmission 160 on a roof 170 of the cabin 180 of the rotorcraft 100.

Figure 2:
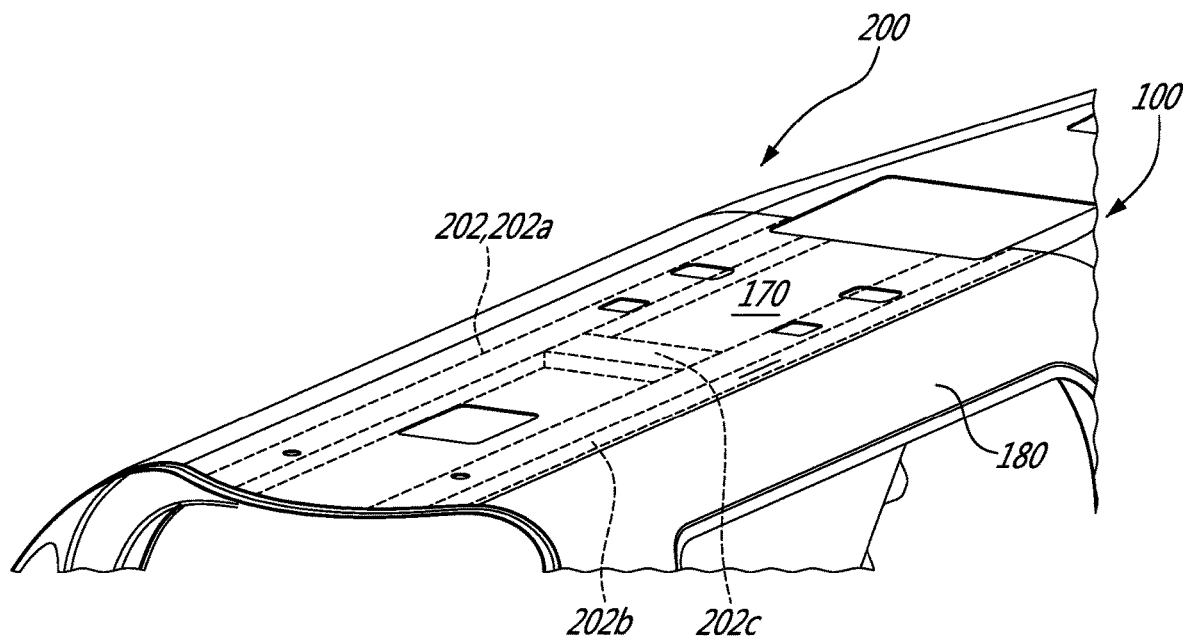
FIG. 2 is a schematic perspective and partially transparent view of a portion of a roof of the aircraft of FIG. 1.

Referring now to FIG. 2, a portion of the roof 170 of the rotorcraft 100 is shown. The roof 170 includes a composite assembly 200 including structural members 202. In the embodiment shown, the structural members 202 are made from composite materials.

In the depicted embodiment, the structural members 202 include two reinforcement members 202a, 202b, also referred to herein has longitudinal members, which are elongated beams. The structural members 202 also include an insert 202c, also referred to herein as a transversal member, joined to both of the two reinforcement members 202a, 202b. The inserts 202c are positioned between the reinforcement members 202a, 202b in a tool or jig 300 (FIG. 3), before the composite assembly 200 is subjected to a cure cycle for co-bonding or co-curing. The inserts may be made for example of cured composite material. In the embodiment shown, the composite assembly 200, once cured, is monolithic.

The term "monolithic" is intended to refer to a structure that is manufactured as a single piece, where the components are integrally connected without joints or seams, including, but not limited to, a structure having adjacent components manufactured from uncured material and simultaneously cured such as to be integrally connected to each other after the curing process. In the depicted embodiment, the monolithic structure is made of composite material including carbon fibers. It is however understood that any suitable composite material may be used which has fibers contained in a matrix of resin, including a thermoplastic or thermoset material.

It is understood that the term "uncured" as used herein is intended to include material that is partially cured to facilitate handling, but still flexible so as to allow forming to a desired shape, including, but not limited to, prepreg material including B-Stage resin. In a particular embodiment, the uncured composite material is a thermoset material that starts as a soft solid or liquid resin, and is irreversibly cured. That is, once it is cured, the thermoset material cannot revert back to its uncured state.

Figure 3:
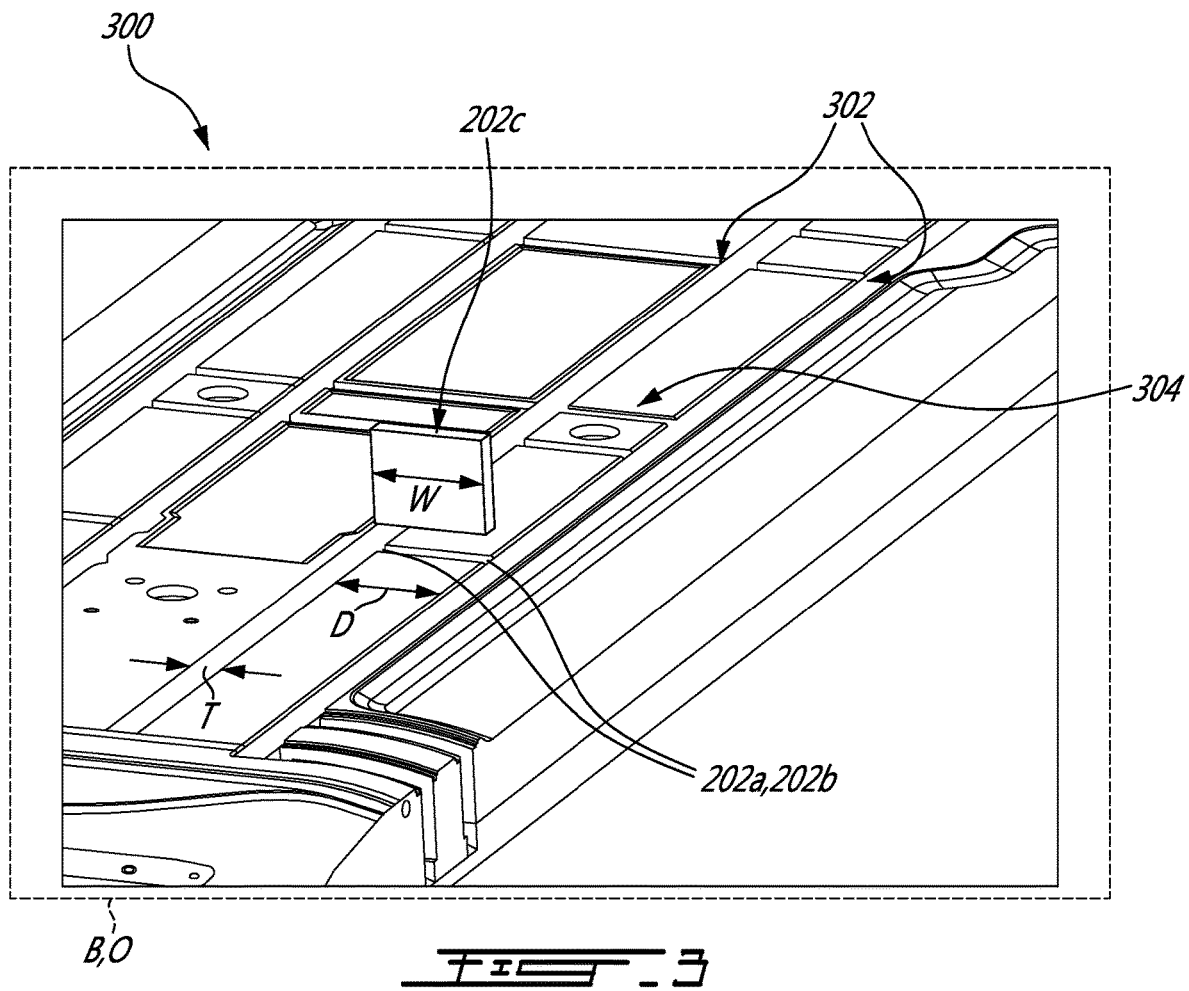
FIG. 3 is a schematic perspective view of a jig used for assembling components of the roof of the aircraft of FIG. 1.

Referring to FIG. 3, the jig 300 is used to manufacture the composite assembly 200. In FIG. 3, the jig 300 is used to co-cure the reinforcement members 202a, 202b in an uncured state, with the insert 202c which is already cured. The jig 300 is provided in the form of a table or mold that defines a plurality of slots. Each of the slots may be used to receive a composite member. The jig 300 in FIG. 3 includes at least two longitudinal slots 302 that are parallel to one another, and one or more transversal slots 304 that extend perpendicularly from one of the two longitudinal slots 302 to the other of the two longitudinal slots 302. Each of the two longitudinal slots 302 slidably receives one of the reinforcement members 202a, 202b, and the transversal slot 304 receives the insert member 202c. The jig 300 with the composite members 202a, 202b, and 202c may be wrapped in a bag B, which is then vacuumed, and the bagged assembly is then cured in an autoclave or oven O.

In the embodiment where the reinforcement members 202a, 202b are both uncured when inserted into the slots 302, it has been observed that a thickness T of the reinforcement members 202a, 202b decreases during the curing process. However, the insert 202c is already cured, and thus will not experience a similar reduction in dimension. As shown in FIG. 3, the insert 202c, which in the depicted embodiment is already cured, has a width W that is greater than a distance D between the two reinforcement members 202a, 202b. The insert 202c is thus too large to fit between the reinforcement members 202a, 202b when they are uncured.

This may prevent formation of the composite assembly 200 with the jig 300 because the manufacturing tolerances of the composite assembly 200 must be very precise to be able to assemble the composite assembly 200 on the roof 170 of the helicopter.

To address this issue, debulking may be required to locally compact and reduce the thickness of the uncured reinforcement members 202a, 202b, without curing them, so that the insert 202c can be positioned between them and co-cured with them.

Figure 4:
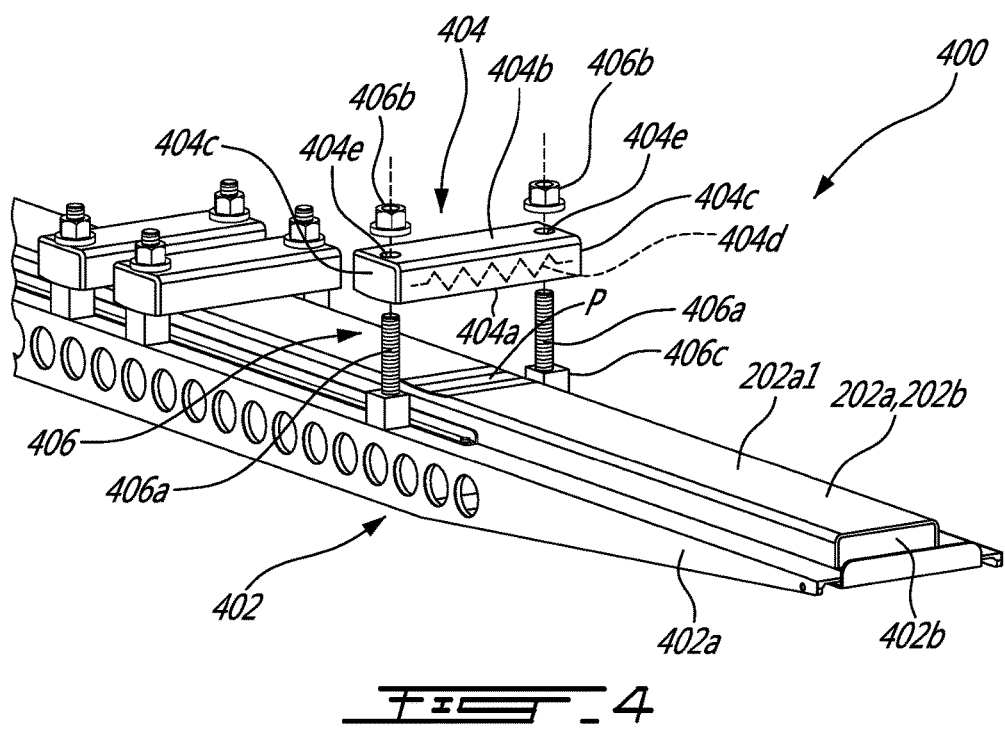
FIG. 4 is a schematic perspective view of a compaction tool for use on the components of the roof of FIG. 3.

Referring now to FIG. 4, a compaction tool 400 is used to locally reduce the thickness of portions of the reinforcement members 202a, 202b so that the insert 202c may be inserted therebetween while the two reinforcement members 202a, 202b are uncured and are held in the jig 300.

As shown in FIG. 4, the compaction tool 400 includes a support 402. The support 402 includes a table 402a and a mandrel 402b that is secured on top of the table 402a. In the depicted embodiment, the reinforcement members 202a, 202b have a C-shaped cross-section. Consequently, a shape of the mandrel 402b is such that the mandrel 402b is able to mate with the C-shaped cross-section of the reinforcement members 202a, 202b. The mandrel 402a has a top wall spaced apart from the table and two side walls extending from the top wall toward the table 402a. The top wall is shaped to contact a web 202a1 of the reinforcement members 202a, 202b. It is understood that the shape of the mandrel 402a may be different and configured to mate with a different shape of the reinforcement members 202a, 202b.

The compaction tool 400 includes a compression unit 404. In the depicted embodiment, the compression unit 404 is provided in the form of a bar having a rectangular prism shape. The compression unit 404 includes a bottom wall 404a, a top wall 404b opposed to the bottom wall 404a and four side walls 404c extending from the bottom wall 404a to the top wall 404b. The bottom wall 404a faces toward the mandrel 402b of the support 402. The bottom wall 404a of the compression unit 404 may be shaped as a negative of a desired shape of the reinforcement member 202a that is compressed with the compression unit 404. Stated differently, the compression unit 404 (e.g., bar) may have a shape corresponding to that of an area or a portion P of the reinforcement member 202a that contacts the insert 202c, and which requires the debulking or thickness reduction.

The compression unit 404 may be made of a metallic material such as steel or cast iron and may have a sufficient thickness defined between the bottom and top walls 404a, 404b so that the compression unit 404 does not bend while in use. The bars are rigid to avoid any deformation during pressing of the reinforcement members 202a, 202b. The compression unit 404 may be made from material having a high fusion temperature that can withstand being heated in an oven.

Still referring to FIG. 4, the compression unit 404 includes a heating element 404d that is embedded between the top and bottom walls 404a, 404b. The heating element 404d may be operatively connectable to a power source and provide sufficient resistance for generating heat from the passage of an electric current. In an alternate embodiment, the compression unit 404 is heated by disposing the compression unit 404 in an oven—this is referred to as "passive" heating. The compression unit 404 may be heated from within by using the heating element 404d—this is referred to as "active" heating. Passive heating allows for not having to monitor the temperature of the compression unit 404 as it corresponds to that of the oven within which it is heated. In the depicted embodiment, the compression unit 404 defines two apertures 404e.

The compaction tool 400 includes a compression device 406 that is used for squeezing the portion P of reinforcement member 202a between the mandrel 402b and the compression unit 404. In the depicted embodiment, the compression device 406 includes two shanks 406a that are each secured on the support 402 on a respective one of opposite sides of the mandrel 402b. Each of the shanks 406a extends away from the support 402. A distance between the two shanks corresponds to a distance between the two apertures 404d of the compression unit 404. Each of the two shanks 406a is slidably received within a respective one of the two apertures 404d of the compression unit 404.

The compression device 406 further includes two nuts 406b that are each threadingly engageable to a respective one of the two shanks 406a. In use, the compression unit 404 is disposed over the two shanks 406a such that the shanks 406a penetrate the apertures 404d, and the compression unit 404 is slid along the two shanks 406a by adjusting the nuts 406b until the bottom wall 404a of the compression unit 404 abuts against the portion P of the reinforcement member 202a. Each of the nuts 406b is threadingly engaged on a respective one of the two shanks 406a until the nut abuts the top wall 404b of the compression unit 404. A force is exerted on the compression unit 404 by tightening the two nuts 406b until the compression unit 404 has exerted the desired pressure or force against the reinforcement member 202a.

In FIG. 4, the compression device 406 further includes stoppers 406c. Each of the two stoppers 406c is disposed on a respective one of the opposite sides of the mandrel 402b of the support 402. The stoppers 406c are provided in the form of a block and have each a top surface that is configured to abut the bottom wall 404a of the compression unit 404 when the desired thickness of the reinforcement member 202a is reached. The stoppers 406c thus limit the displacement of the compression unit 404 toward the mandrel 402b and the reinforcement member 202a disposed thereon. In the embodiment shown, the stoppers 406c are secured between the shanks 406a and the table 402a of the support 402. In other words, the shanks 406a are secured to the table 402a of the support 402 via the stoppers 406c. However, it is understood that any other suitable configuration is possible.

In the depicted embodiment, the compaction tool 400 includes more than one compression device 404 and compression unit 406, three of each being shown in FIG. 4. This might allow the compaction tool 400 to decrease the thickness of the reinforcement member 202a at a plurality of locations or portions along the reinforcement member 202a at the same time. Alternatively, the compaction tool 400 may include only one compression unit 404 and only one compression device 406 and the reinforcement member 202a may be moved relative to the mandrel 402b to decrease the thickness of the reinforcement member 202a at a plurality of different locations.

It is understood that although the compression device has been shown as including shanks 406a and nuts 406b, any other technique for squeezing or compressing the portion P of the reinforcement member 202a between the mandrel 402b and the compression unit 404 may be used. For instance, the compression unit 404 may be connected to the support 402 via hydraulic pistons, linear actuators, electric actuators, solenoids or any other suitable means that might be used to linearly move the compression unit 404 relative to the mandrel 402b. In a particular embodiment, a weight disposed on the compression unit 404 may be used to exert pressure on the reinforcement member 202a. In a particular embodiment, a vacuum pressure and/or an autoclave pressure may be used to exert pressure on the reinforcement member 202a.

The compaction tool 400 having been described, a method of forming a composite member is described herein below.

Referring to FIG. 4, each uncured reinforcement member 202a, 202b is received against a support (e.g., mandrel 402b) and heated bars (e.g. compression unit 404) are pressed against the uncured portion P of the uncured reinforcement member 202a, 202b to locally compact the portion P and reduce its thickness. The thickness of the portion P is thus less than the thickness of the reinforcement member 202a, 202b immediately adjacent to the portion P. The thickness of the portion P is thus less than the thickness of the remainder of the reinforcement member 202a, 202b. The reduced thickness of the portion P may correspond only to the areas of the reinforcement member 202a, 202b that will be contacting the inserts 202c, so as to allows the inserts 202c to be placed between adjacent uncured reinforcement members 202a, 202b. The compression unit 404 may be heated before use, for example in an oven set to the desired temperature, or, as described above, can include heating elements producing heat as the compression unit 404 is pressed against the reinforcement member 202a, 202b. The bars are heated to the required temperature to achieve fiber compaction but not polymerization (cure) of the uncured resin, for example 180 degrees F.

The above technique may be helpful when dealing with complex structures through a one-time assembly and oven curing. The process might allow better control of the compaction and thickness of uncured fibres in very specific areas, for example where it is required to place an insert adjacent an uncured part in a very precise assembly.

Referring more particularly to FIG. 4, pressure and heat are applied with the compaction tool 400 to the portion P of the uncured reinforcement member 202a to decrease a thickness of the portion P. The heat applied by the compaction tool 400 is at a temperature that is less than a curing temperature of the uncured reinforcement member 202a. For example, the temperature at which the compaction tool 400 is applied to the portion P may be 180 degrees F., whereas the curing temperature of the reinforcement member 202a may be 350 degrees F. The reinforcement member 202a is therefore not cured after applying pressure and heat with the compaction tool 400. In a particular embodiment, the compaction tool 400 applies heat at a temperature of 180 degrees F. for a maximum of 60 minutes.

Figure 5:
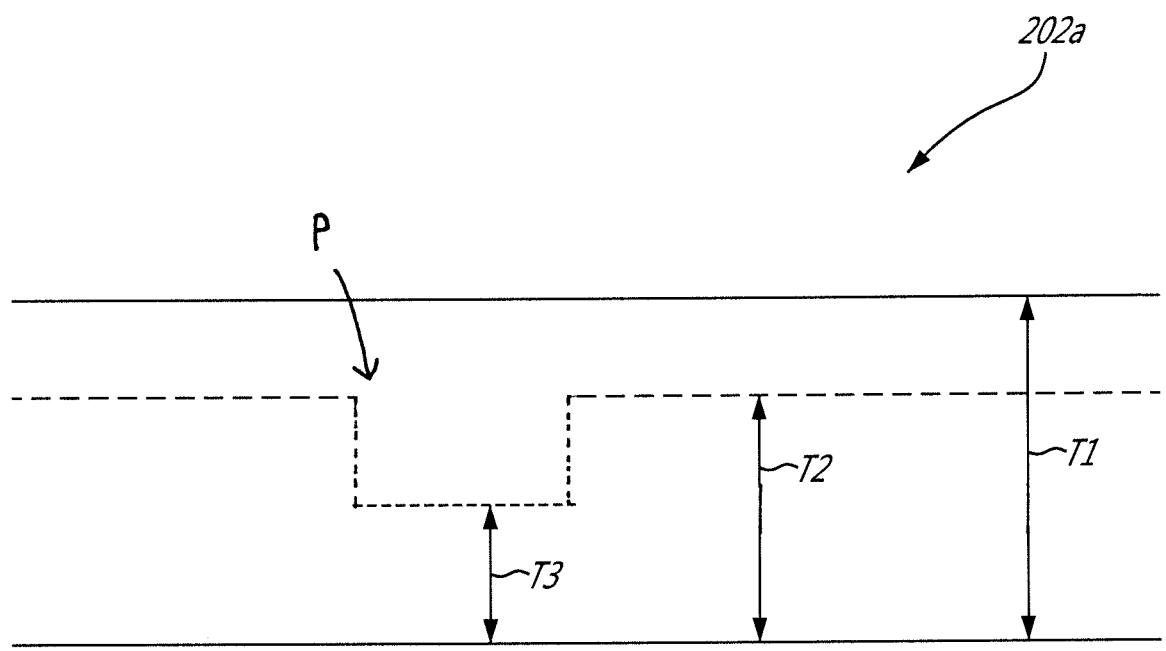
FIG. 5 is a schematic cross-sectional view of a component of a composite assembly showing a variation in its thickness throughout a process of forming the composite assembly.

Referring also to FIG. 5, a variation of a thickness of the reinforcement member 202a is illustrated. In the uncured state, the reinforcement member 202a has an initial uncured thickness T1. Then, the reinforcement member 202a is subjected to a debulk where it is put in a bag and vacuumed during a given period of time to globally decrease the thickness of the reinforcement member 202a. The debulking decreases the thickness of the reinforcement member 202a from the uncured thickness T1 to a debulked thickness T2 being less than the uncured thickness T1. Then, pressure and heat are applied to the portion P of the reinforcement member 202a and the thickness of the reinforcement member 202a at the portion is decreased to its final cured thickness T3. Then, the reinforcement member 202a is cured and its thickness may remain constant during the curing. As shown in FIG. 5, the application of heat and pressure to reduce the thickness of the portion P may reduce the thickness of the portion P of the reinforcement member 202a to its final, cured thickness T3 before the reinforcement member 202a is subjected to the curing process.

In the depicted embodiment, applying pressure and heat includes heating the compression unit 404 of the compaction tool 400 from within the compression unit. Heating the compression unit 404 may include heating the compression unit 404 with the heating element 404d located within the compression unit 404. Heating the compression unit 404 with the heating element 404d may include heating the compression unit 404 with the heating element 404d before the compression unit 404 is in contact with the reinforcement member 202a.

In the embodiment shown, applying pressure and heat includes linearly displacing the compression unit 404 of the compaction tool 400 against the portion of the uncured reinforcement member 202a. Linearly displacing the compression unit 404 may include limiting a displacement of the compression unit 404 against the portion P of the reinforcement member 202a, such as with the stoppers 406c.

In the embodiment shown, the uncured reinforcement member 202a is laid against the mandrel 402b of the compaction tool 402 and applying pressure and heat includes squeezing the portion of the reinforcement member 202a between the compression unit 404 and the mandrel 402b.

In the illustrated embodiment, applying pressure and heat includes applying pressure and heat to the web 202a1 of the reinforcement member 202a having a C-shaped cross-sectional shape, to decrease the thickness of the portion of the web 202a1.

Heating the portion of the reinforcement member 202a may include heating the portion for about 15 minutes at 180 degrees F. Compressing the portion P of the uncured reinforcement member 202a may include applying a force on the reinforcement member 202a. The force may vary as a function of a quantity of plies to compress and of a time duration during which the pressure is applied. In other words, for the same amount of plies, forces can vary based on the time duration during which the pressure is applied. In a particular embodiment, the force is increased until the compression unit 404 abuts or sits on the stopper 406c.

In the present embodiment, curing the reinforcement member 202a after applying pressure and heat includes placing the reinforcement member 202a within a bag B; vacuuming air out of the bag B; and heating the reinforcement member in an oven O (FIG. 3). In a particular embodiment, a caul plate may be used for curing the composite assembly.

For forming the composite assembly 200 from the reinforcement member 202a, the second reinforcement member 202b, and the insert 202c, pressure and heat are applied with the compaction tool 400 to the portion P of the uncured reinforcement member 202a to decrease the thickness T of the portion P. The heat is applied with the compaction tool 400 being at a temperature less than a curing temperature of the reinforcement member 202a. The cured insert 202c is inserted between, and in contact with, the portion P of the reinforcement member 202a and the second reinforcement member 202b; and the members 202a, 202b, 202c are co-cured to form the composite assembly 200 after applying pressure and heat.

The second reinforcement member 202b may be uncured. Pressure and heat may be applied with the compaction tool 400 to a second portion of the uncured second reinforcement member 202b to decrease a thickness of the second portion to be less than a thickness of a remainder of the second reinforcement member 202b. The heat may be applied with the compaction tool 400 and is at a temperature less than a curing temperature for the second reinforcement member 202b.

In the embodiment shown, inserting the cured insert 202c includes inserting the insert 202c between, and in contact with, the portion of the reinforcement member 202a and the second portion of the second reinforcement member 202b after their thicknesses have been reduced.

In the embodiment shown, co-curing the members 202a, 202b, 202c includes disposing the members within the bag B; vacuuming air out of the bag B; and heating the uncured, second, and cured composite members in the oven O.

In a particular embodiment, the uncured composite member 202a is debulked before applying pressure and heat with the compaction tool to the portion of the uncured composite member.

The compression unit 402 may be heated to the required temperature in accordance with industry standards, to achieve compaction of the fibers of the reinforcement member 202a, but not polymerization of the uncured resin of the reinforcement member 202a. In a particular embodiment, applying the pressure and heat with the compaction tool 400 to decrease the thickness of the reinforcement member 202a may decrease the thickness to a value less than a thickness of the reinforcement member 202a after a hot debulk under vacuum. In a particular embodiment, curing the reinforcement member 202a includes curing the reinforcement member 202a to decrease the thickness of the portion P to the cured thickness.

In a particular embodiment, locally decreasing the thickness of the reinforcement member 202a before the curing of the composite assembly 200 has no effect on a joint between the insert 202c and the reinforcement member 202a. In a particular embodiment, curing the composite assembly 200 will decrease the thickness of the reinforcement member 202a to be equal to the thickness achieved with the compaction tool. In other words, after curing, the reinforcement member 202a may have a uniform thickness along its length.

In a particular embodiment, the above described process assist in control of the compaction and thickness of uncured fibres in very specific areas, for example when an insert or other cured and/or uncured parts is needed in a precise assembly.

Typically, a conventional "Hot Debulk" process requires the whole assembly to be placed in an oven. This might be more complex, difficult to bag, require the materials to be protected against contaminants, require longer cycle time, and more oven space. With the above described process and compaction tool 400, it is possible to locally heat and compress fibres of an uncured part without having to bag, vacuum, and heat an entire assembly.

In a particular embodiment, the above described process may help when dealing with the one-time assembly of a complex structure and oven curing, and enhance the possibilities of complex structural composite assembly technology.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "top", "bottom", "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction Embodiments disclosed herein include:

A. A method of forming a composite member, comprising: applying pressure and heat with a compaction tool to a portion of an uncured composite member to decrease a thickness of the portion, the heat applied with the compaction tool being at a temperature less than a curing temperature of the uncured composite member; and curing the uncured composite member after applying pressure and heat.

B. A method of forming a composite assembly from an uncured composite member, a second composite member, and a cured composite member, the method comprising: applying pressure and heat with a compaction tool to a portion of the uncured composite member to decrease a thickness of the portion, the heat applied with the compaction tool being at a temperature less than a curing temperature of the uncured composite member; inserting the cured composite member between, and in contact with, the portion of the uncured composite member and the second composite member; and curing the uncured, second, and cured composite members to form the composite assembly after applying pressure and heat.

Embodiments A and B may include any of the following elements in any combinations:

Element 1: applying pressure and heat includes heating the compaction tool from within. Element 2: heating the compaction tool includes heating the compaction tool with a heating element within the compaction tool. Element 3: heating the compaction tool with the heating element includes heating the compaction tool with the heating element before the compaction tool is in contact with the portion of the uncured composite member. Element 4: applying pressure and heat includes linearly displacing the compaction tool against the portion of the uncured composite member. Element 5: linearly displacing the compaction tool includes limiting a displacement of the compaction tool against the portion of the uncured composite member. Element 6: laying up the uncured composite member against a mandrel, wherein applying pressure and heat includes squeezing the portion of the uncured composite member between the compaction tool and the mandrel. Element 7: applying pressure and heat includes applying pressure and heat to a web of the uncured composite member having a C-shaped cross-sectional shape, to decrease the thickness of a segment of the web. Element 8: applying pressure and heat includes heating the portion for about 15 minutes at 180 degrees F. The Element 9: applying pressure and heat includes applying a force on the portion of the uncured composite member with the compaction tool until the compaction tool abuts a stopper and is prevented from further displacing. Element 10: applying pressure and heat includes applying pressure and heat with the compaction tool to decrease the thickness of the portion until the thickness reaches a cured thickness. Element 11: curing the uncured composite member after applying pressure and heat includes placing the uncured composite member within a bag, vacuuming air out of the bag, and heating the uncured composite member in the bag. Element 12: debulking the uncured composite member before applying pressure and heat with the compaction tool to the portion of the uncured composite member. Element 13: the second composite member is uncured, the method comprising applying pressure and heat with the compaction tool to a second portion of the uncured second composite member to decrease a thickness of the second portion to be less than a thickness of a remainder of the second uncured composite member, the heat applied with the compaction tool being at a temperature less than a curing temperature for the uncured second composite member. Element 14: inserting the cured composite member includes inserting the cured composite member between, and in contact with, the portion of the uncured composite member and the second portion of the uncured second composite member. Element 15: curing the uncured, second, and cured composite members includes placing the uncured, second, and cured composite members within a bag, vacuuming air out of the bag, and heating the uncured, second, and cured composite members in the bag.

C. A compaction tool for an uncured composite member, comprising: a support configured to receive the uncured composite member thereon, a compression unit displaceable toward and away from the support and heatable to a temperature below a curing temperature of the uncured composite member, and a compressing device operable to displace the compression unit toward the support and against a portion of the uncured composite member to compact the portion between the heated compression unit and the support and reduce a thickness of the portion to be less than a thickness of a remainder of the uncured composite member.

Embodiment C may include any of the following elements in any combinations:

Element 16: the compression unit includes a heating element embedded therein and operatively connectable to a power source. Element 17: the compressing device includes at least one shank secured to the support and slidably received within at least one aperture defined through the compression unit, a nut in threaded engagement with the shank and being in contact with the compression unit for displacing the compression unit toward the support. Element 18: the support is a mandrel extending along a longitudinal axis, a cross-sectional shape of the mandrel taken in a plane normal to the longitudinal axis being rectangular and configured to mate with the uncured composite member having a C-shaped cross-sectional shape. Element 19: a stopper between the support and the compression unit, the stopper being abuttable against the compression unit, the compression unit spaced apart from the support when the compression unit is abutted against the stopper. Element 20: the compression unit has a flat wall facing toward the support and shaped to compress a web of the uncured composite member.

The above description is meant to be exemplary only, and one skilled in the art will recognize that changes may be made to the embodiments described without departing from the scope of the invention disclosed. For example, other portions of the helicopter, such as the fuselage, or components thereof, may be manufactured using the above described process and compaction tool. This process could be applied anywhere complex composite structure are involved: aerospace, small boats, automobiles, etc. Still other modifications which fall within the scope of the present invention will be apparent to those skilled in the art, in light of a review of this disclosure, and such modifications are intended to fall within the appended claims.

The invention claimed is:

1. A method of forming a composite member, comprising:
applying pressure and heat with a compaction tool to a portion of an uncured composite member to decrease a thickness of the portion while leaving unchanged a thickness of at least another portion of the uncured composite member, the heat applied with the compaction tool being at a temperature less than a curing temperature of the uncured composite member; and
curing the uncured composite member after applying pressure and heat.

2. The method of claim 1, wherein applying pressure and heat includes heating the compaction tool from within.

3. The method of claim 1, wherein applying pressure and heat includes linearly displacing the compaction tool against the portion of the uncured composite member and limiting a displacement of the compaction tool against the portion of the uncured composite member.

4. The method of claim 1, comprising laying up the uncured composite member against a mandrel, wherein applying pressure and heat includes squeezing the portion of the uncured composite member between the compaction tool and the mandrel.

5. The method of claim 1, wherein applying pressure and heat includes heating the portion for about 15 minutes at 180 degrees F.

6. The method of claim 1, wherein applying pressure and heat includes applying a force on the portion of the uncured composite member with the compaction tool until the compaction tool abuts a stopper and is prevented from further displacing.

7. The method of claim 1, wherein applying pressure and heat includes applying pressure and heat with the compaction tool to decrease the thickness of the portion until the thickness reaches a cured thickness.

8. The method of claim 1, wherein applying pressure and heat includes applying pressure and heat with the compaction tool to the portion of the uncured composite member to decrease the thickness of only the portion of the uncured composite member.

9. The method of claim 1, wherein applying pressure and heat includes applying pressure and heat with the compaction tool to the portion of the uncured composite member to decrease the thickness of the portion compared to a thickness of one or more other portions of the uncured composite member immediately adjacent to the portion.

10. A method of forming a composite assembly from an uncured composite member, a second composite member, and a cured composite member, the method comprising:
applying pressure and heat with a compaction tool to a portion of the uncured composite member to decrease a thickness of the portion while leaving unchanged a thickness of at least another portion of the uncured composite member, the heat applied with the compaction tool being at a temperature less than a curing temperature of the uncured composite member;
inserting the cured composite member between, and in contact with, the portion of the uncured composite member and the second composite member; and
curing the uncured, second, and cured composite members to form the composite assembly after applying pressure and heat.

11. The method of claim 10, wherein the second composite member is uncured, the method comprising applying pressure and heat with the compaction tool to a second portion of the uncured second composite member to decrease a thickness of the second portion to be less than a thickness of a remainder of the second uncured composite member, the heat applied with the compaction tool being at a temperature less than a curing temperature for the uncured second composite member.

12. The method of claim 11, wherein inserting the cured composite member includes inserting the cured composite member between, and in contact with, the portion of the uncured composite member and the second portion of the uncured second composite member.

13. The method of claim 10, wherein applying pressure and heat includes heating the compaction tool from within.

14. The method of claim 10, wherein applying pressure and heat includes linearly displacing the compaction tool against the portion of the uncured composite member and limiting a displacement of the compaction tool against the portion of the uncured composite member.

15. The method of claim 10, comprising laying up the uncured composite member against a mandrel, wherein applying pressure and heat includes squeezing the portion of the uncured composite member between the compaction tool and the mandrel.

16. The method of claim 10, wherein applying pressure and heat includes applying pressure and heat to a web of the uncured composite member having a C-shaped cross-sectional shape, to decrease the thickness of a segment of the web.

17. The method of claim 10, wherein applying pressure and heat includes applying pressure and heat with the compaction tool to decrease the thickness of the portion until the thickness reaches a cured thickness.

18. The method of claim 10, wherein applying pressure and heat includes applying pressure and heat with the compaction tool to the portion of the uncured composite member to decrease the thickness of only the portion of the uncured composite member.

19. The method of claim 10, wherein applying pressure and heat includes applying pressure and heat with the compaction tool to the portion of the uncured composite member to decrease the thickness of the portion compared to a thickness of one or more other portions of the uncured composite member immediately adjacent to the portion.

20. A method of forming a composite assembly from an uncured composite member, a second composite member, and a cured composite member, the method comprising:
applying pressure and heat with a compaction tool to a web of the uncured composite member having a C-shaped cross-sectional shape of the uncured composite member to decrease a thickness of a segment of the web, the heat applied with the compaction tool being at a temperature less than a curing temperature of the uncured composite member;
inserting the cured composite member between, and in contact with, the portion of the uncured composite member and the second composite member; and
heating the uncured, second, and cured composite members to cure the uncured and second composite members and to form the composite assembly after applying pressure and heat.

* * * * *